United States Patent [19]
McKay et al.

[11] Patent Number: 5,269,595
[45] Date of Patent: Dec. 14, 1993

[54] EMPTY/LOAD CHANGEOVER VALVE FOR RAILWAY CAR

[75] Inventors: Albert A. McKay, Stoney Creek, Canada; James E. Hart, Trafford, Pa.

[73] Assignee: Westinghouse Air Brake Company, Wilmerding, Pa.

[21] Appl. No.: 963,954

[22] Filed: Oct. 19, 1992

[51] Int. Cl.⁵ .............................................. B60T 8/18
[52] U.S. Cl. ................................ 303/22.2; 303/22.7; 188/195
[58] Field of Search ............ 303/9.69, 22.2, 22.3, 303/22.6, 22.7, 22.8; 188/195

[56] References Cited

U.S. PATENT DOCUMENTS

| | | | |
|---|---|---|---|
| Re. 28,539 | 9/1975 | Scott | 303/22.6 |
| 2,830,849 | 4/1958 | Erson et al. | 303/22.2 |
| 3,369,846 | 2/1968 | Scott | 303/22.6 |
| 3,376,080 | 4/1968 | Kettering et al. | 303/22.6 |
| 3,612,621 | 10/1971 | Scott | 303/22.6 |
| 3,671,086 | 6/1972 | Scott | 303/22.2 |
| 4,080,005 | 3/1978 | Engle | 303/22.6 |
| 4,235,477 | 11/1980 | Hart | 303/22.6 |
| 4,235,478 | 11/1980 | Billeter | 303/22.2 |
| 4,585,279 | 4/1986 | Doto | 188/195 X |
| 4,786,117 | 11/1988 | Hart | 303/22.6 |
| 4,801,179 | 1/1989 | Hintner | 303/22.2 |
| 5,005,915 | 4/1991 | Hart et al. | 303/22.2 |
| 5,100,207 | 3/1992 | Mckay | 303/22.2 |
| 5,106,168 | 4/1992 | Mckay | 303/22.2 |

FOREIGN PATENT DOCUMENTS

| | | | |
|---|---|---|---|
| 731499 | 4/1966 | Canada | 303/22.2 |
| 2520461 | 11/1976 | Fed. Rep. of Germany | 303/22.6 |

*Primary Examiner*—Robert J. Oberleitner
*Assistant Examiner*—Peter M. Poon
*Attorney, Agent, or Firm*—G. J. Falce

[57] ABSTRACT

An empty/load changeover valve device for a railway car having a proportioning valve via which the car control valve supplies brake cylinder pressure. The proportioning valve comprises a balance piston having equal opposing pressure areas and a combined supply and release check valve, one pressure area of the balance piston being subject to air pressure supplied to the brake cylinder under all conditions of loading. The opposing pressure area of the balance piston is either pressurized or depressurized depending upon the car being in an "empty" or "load" condition, thereby establishing either a nonproportioning or a proportioning mode of brake control. Integrating the release check valve with the supply valve so as to have a smaller effective pressure area, the release check valve can be opened with low force to exhaust brake cylinder pressure during brake release, thereby making possible a reduced size empty/load changeover valve device.

10 Claims, 1 Drawing Sheet

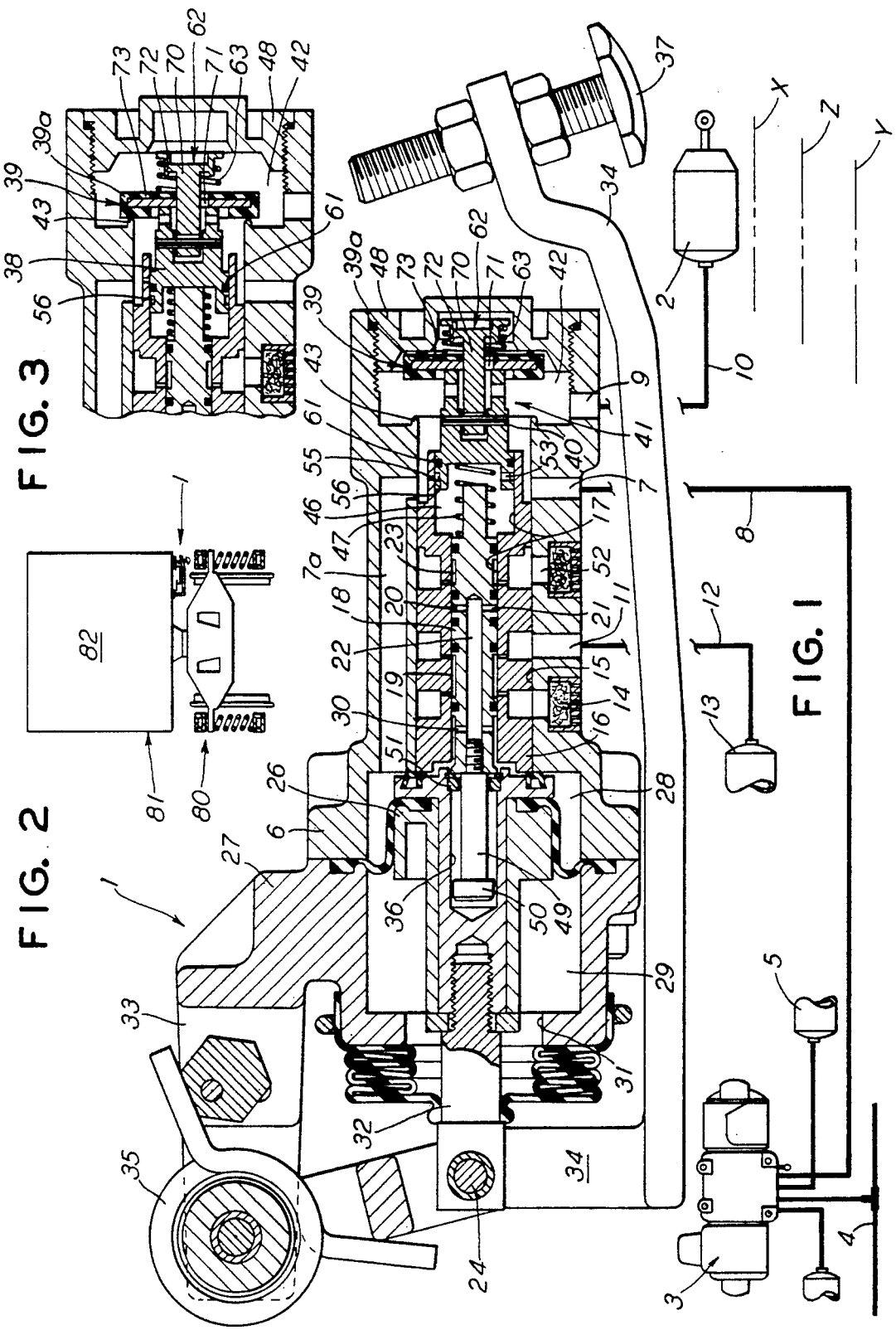

EMPTY/LOAD CHANGEOVER VALVE FOR RAILWAY CAR

BACKGROUND OF THE INVENTION

The present invention relates to an empty/load type brake control system for a railway freight car and, more particularly, to an empty/load changeover valve device that employs a proportioning valve to load-adjust the brake cylinder pressure in the empty range of car weight.

Single capacity brake equipment produces a brake shoe force that is independent of car loading, thus making it difficult to achieve desirably higher braking ratios for a loaded car without exceeding an empty car braking ratio sufficient to cause wheel slide. Sliding wheels are undesirable from the standpoint of reduced braking retardation, and slid-flat wheels.

Special brake equipment is therefore necessary to increase the loaded car braking ratio without incurring the consequence of a wheel slide condition when braking an empty car. Such equipment automatically adjusts brake shoe force according to the load condition of the car. These special equipments fall into two primary categories, dual capacity empty/load braking and multiple capacity or continuously variable braking.

In the dual capacity empty/load equipment, there are just two settings, one for "empty" braking and one for "load" braking, the changeover point between the "empty" and "load" settings being selected at some predetermined car weight, usually at 20% of the full load capacity weight. In arbitrarily selecting this changeover point, it will be appreciated that a given car can be generally under-braked by the reduced brake pressure when the car weight is in the upper end of the "empty" weight range, since essentially the same adhesion demand is available at the lower end of the "load" weight range at which maximum braking force is capable of being supported without sliding the car wheels.

In the variable load type equipment, braking pressure is proportioned according to the actual load, generally throughout the full range of car loading. It will be appreciated, however, that the proportioned brake pressure is selected in accordance with the maximum brake pressure (emergency) capable of being developed from the maximum running pressure normally carried by a train (110 psi). Therefore, when making relatively light service brake applications or when making a maximum brake application from a relatively low running pressure (70 psi), the proportioned brake pressure may be far less than that capable of being supported by the adhesion demand. Accordingly, less than optimum brake efficiency is realized under certain brake conditions with variable load type brake equipment, as well as single capacity equipment, in order to protect against wheel sliding on an empty car under maximum braking conditions.

In known dual capacity brake systems such as disclosed in U.S. Pat. No. 3,671,086, this problem is overcome by a proportioning valve arrangement that reduces the braking pressure by a fixed ratio during empty car braking. In order to be compatible with the quick service limiting valve requirements for freight brake control valves, which assures that 8 to 12 psi brake cylinder pressure will be developed from even the lightest service application, the aforementioned system withholds the empty/load sensing function until a predetermined minimum brake cylinder pressure has developed, generally 12 psi. However, since an equalizing volume is required in such proportional type dual capacity systems to maintain proper control valve operation, an inadvertent loss of braking pressure can occur when the empty/load changeover valve sensing function comes into play, due to the existing brake cylinder pressure being able to momentarily backflow into the equalizing volume. This occurs when a light service reduction is made, just sufficient to operate the load sensing valve on empty cars, in which case, the brake cylinder pressure can build up to 12 psi and then be reduced back to the limiting valve pressure setting on each car, which can be as light as 8 psi. This is caused by the brake cylinder air flowing into the empty/load equalizing volume.

The empty/load valve device disclosed in U.S. Pat. No. 5,005,915 overcomes this problem by providing a backflow check valve integral with a proportioning valve that is oriented to open in the flow direction of brake cylinder supply pressure and to close in the opposite direction corresponding to the exhaust of brake cylinder pressure. Such an arrangement prevents any inadvertent backflow of brake cylinder pressure and consequent loss of braking power, as could otherwise occur when the proportioning of brake cylinder pressure is initiated during a brake application, due to the fact that a previously vented equalizing reservoir is connected to the car control valve in parallel with the brake cylinder at this time.

While this backflow control provided by the proportioning valve check valve is desirable during a brake application, the check valve must be physically opened during brake release to prevent the brake cylinder pressure from being inadvertently trapped. In the aforementioned U.S. Pat. No. 5,005,915, a retracting spring acts through the sensing arm actuating piston and empty/load spool valve to open the proportioning valve check valve against the opposing force of brake cylinder pressure acting thereon when the spool valve is shifted to its normal release position during brake release.

Due to the spring force required to unseat the proportioning valve check valve under all conditions of brake pipe pressure, however, the actuating piston would have to be prohibitively large, from a commercial standpoint, to operate the sensing arm against the retracting spring at the desired brake cylinder pressure of approximately 12-20 psi during a brake application.

SUMMARY OF THE INVENTION

It is accordingly the object of the present invention to make possible a unitary empty/load changeover valve device of such size as to meet space constraints on existing railway freight cars by providing an integral proportioning valve and release check valve arrangement.

It is an attendant object of the present invention to accommodate car rock and roll oscillations without affecting the brake pressure modulation of an empty car equipped with an empty/load changeover valve having the aforementioned integral proportioning valve and release check valve arrangement.

It is a further object of the invention to provide an integral proportioning valve and release check valve arrangement that offers a long service life.

In accordance with the foregoing objectives, there is provided an empty/load changeover valve device for use in a railway vehicle brake control system that includes a brake cylinder, and a brake control valve via which fluid under pressure is connected to the brake cylinder and released therefrom. The changeover valve device includes a load sensing arm for measuring the distance between the vehicle sprung and unsprung members to provide an empty setting and a load setting of the changeover valve device depending upon this distance being greater or less than a predetermined distance. An inlet passage of the changeover valve device is connected to the control valve and an outlet passage is connected to the brake cylinder. A valve element of a proportioning valve is engageable with a fixed valve seat in the inlet passage in order to interrupt pressurization of the brake cylinder in a closed position and to permit such pressurization in an open position. A balance piston of the proportioning valve having equal opposing pressure areas is connected to the valve element, one of the pressure areas being subject to the pressure at the inlet passage. The other pressure area of the balance piston is pressurized in the load setting of the changeover valve to maintain the check valve element in its open position consistent with a non-proportional mode of operation. Empty/load valve means depressurizes this other pressure area in the empty setting, whereby a fluid pressure force imbalance is established across the balance piston in the direction of closure of the proportioning valve element to initiate a proportional mode of operation.

A release check valve is incorporated with the proportioning valve and is adapted to be opened with low force independently of the proportioning valve. With such an arrangement, the required force of the sensing arm retracting spring is relatively light, so as to not require a high pressure force to overcome the spring load, thereby allowing use of a relatively small actuating piston to limit the overall size of the changeover valve device.

The foregoing objects and other objects, features and advantages of the present invention will become apparent from the following more detailed explanation when taken in conjunction with the accompanying drawings in which:

FIG. 1 is a sectional assembly view of an empty/load changeover valve device of the present invention connected between a control valve device and brake cylinder of a railway car and shown in its de-actuated condition;

FIG. 2 shows a railway car in outline including a body or sprung portion on which the empty/load changeover valve of FIG. 1 is mounted and a truck or unsprung portion with which the empty/load valve sensing arm is engageable as a measure of the car body deflection and accordingly the car load; and FIG. 3 is a partial sectional assembly view of the empty/load changeover valve of FIG. 1 showing operation of the release check valve during a brake release.

DESCRIPTION AND OPERATION

In accordance with the present invention, there is shown in FIG. 1 an empty/load changeover valve device 1 interposed between a brake cylinder device 2 and a freight brake control valve device 3, such as a conventional ABDW type brake control valve device. As is well known, such a control valve device 3 operates on the pressure equalization principle in response to reductions of the air pressure carried in a train brake pipe 4. An auxiliary reservoir 5 is charged to the pressure carried in brake pipe 4 and supplies air to brake cylinder device 2 in response to and in an amount dependent upon the reduction of brake pipe pressure, as controlled by control valve device 3. Pressure equalization exists between the compressed air in brake cylinder 2 and auxiliary reservoir 5 when a full service reduction of the brake pipe pressure is made.

The main body 6 of changeover valve device 1 is provided with an inlet passage 7 that is connected by a brake cylinder supply pipe 8 to control valve device 3, an outlet passage 9 that is connected by a delivery pipe 10 to brake cylinder device 2, a passage 11 that is connected by a pipe 12 to an equalizing reservoir 13, and vent passages 14, 52 that are open to atmosphere.

Main body 6 further includes a bore 15 in which a bushing 16 is fixed, the respective passages 11, 14 and 52 being connected to a stepped bore 17 of bushing 16, in the smaller diameter of which a spool valve 18 is axially disposed. Surrounding the periphery of spool valve 18 are annular grooves 19, 20 and 23, groove 20 having a connecting port 21 leading to a central passage 22 of spool valve 18. Annular O-ring seals surrounding the periphery of spool valve 18 seal the respective annular grooves.

A diaphragm type actuating piston 26 is clamped between main body 6 and an end body 27 to form on one side an actuating chamber 28 and on the other side a vent chamber 2 9. Actuating chamber 28 is communicated with central passage 22 of spool valve 18 via a connecting port 30 adjacent the left-hand end of the spool valve, and with inlet passage 7 via a branch passage 7a.

Projecting through an opening 31 in end body 27 is a push rod 32 of actuating piston 26. An extension 33 of end body 27 pivotally supports a sensor arm 34 to which push rod 32 is connected by a pin 24 to effect rotation of the sensor arm in response to operation of the actuating piston against the resistance of a torsion type retracting spring 35. In its retracted position, as shown, actuating piston 26 is engaged with a stop provided by the area of body 6 surrounding bore 15, and an adjusting screw 37 of sensor arm 34 is displaced from an unsprung member, such as the truck side frame 80 of a railway car 81, on the body 82 or sprung portion of which is mounted changeover valve device 1, as shown in FIG. 2. Reference line X in FIG. 1 represents the position of the car side frame 80 relative to the car body 82 in a full load condition of car weight. Reference line Y represents the position of the car side frame 80 relative to the car body 82 in a completely empty condition of car weight. A changeover point Z is selected representing the car weight at which transition occurs between an empty and load condition of car weight.

Aligned axially in the larger diameter of bore 17 adjacent the right-hand side of spool valve 18 is a balance piston 38 having an annular groove 56 and an O-ring seal 61 surrounding its periphery. Balance piston 38 cooperates with a pressure control valve 39, each of which have equal opposing pressure areas and together comprise a proportioning valve 41 that may be controlled to operate in either a proportioning mode or in a non-proportioning mode. Pressure control valve 39 consists of an annular valve element 39a and a release check valve 62 having a stem 70 that passes through an opening 71 in valve element 39a and is connected to balance piston 38 by a roll pin 40, for example. Release check valve 62 further includes an annular valve seat 72 that is adapted to engage the right hand side of valve element 39a when pulled leftward by balance piston 38 following engagement of valve element 39 with valve seat 43. A bias spring 63 is located between release check valve 62 and valve element 39a to bias check valve seat 72 in an open direction. The strength of spring 63 is a function of the air pressure in cavity 42 and the area enclosed by valve seat 72. Spring 63 must be marginally stronger than the area of valve seat 72 times the maximum pressure developed in chamber 42 (in empty) such that during a brake release, spring 63 can vent the brake cylinder, unaided by retracting spring 35 (this condition would only exist should spring 35 fail).

On the other side of the equation bias spring 63 must be lighter than the force created by the area of piston 38 times the pressure in passage 7 after equalization volume 13 has been charged. This constraint ensures that check valve seat 72 closes when valve 41 moves to empty position and valve element 39a seats with valve seat 43. The left hand side of valve element 39a of pressure control valve 39 is arranged to engage and disengage an annular valve seat 43 that is fixed between bore 15 and a chamber 42 into which bore 15 opens on the side of bore 15 opposite actuating chamber 28. Inlet passage 7 opens into bore 15 at one side of valve seat 43 and outlet passage 9 opens into chamber 42 at the other side of valve seat 43. Accordingly, engagement of valve element 39a with valve seat 43 serves to interrupt the flow of compressed air between control valve device 3 and brake cylinder device 2, and the disengagement of valve element 39a from valve seat 43 establishes this flow path. Provided in bushing 16 is a port 55 that connects the area of bore 15 at the one side of seat 43 to stepped bore 17 in which balance piston 38 operates.

Depending upon the axial position of balance piston 38, O-ring 61 either cuts off or establishes communication between port 55 and an annular groove 56 on the periphery of balance piston 38. A balance chamber 46 that is formed between spool valve 18 and balance piston 38 is connected to annular groove 56 by a connecting port 53 in balance piston 38.

Disposed in balance chamber 46 between spool valve 18 and balance piston 38 is a proportioning spring 47. In addition to providing the desired variable effect on the proportional brake cylinder pressure through the empty range of car loading, this proportioning spring 47 also counteracts the differential pressure force on spool valve 18, due to the air pressure effective in actuating chamber 28, in order to stabilize the spool valve in the face of car rock and roll oscillations. The smaller pressure area of spool valve 18 relative to the effective pressure area of balance piston 38 limits the force that spring 47 can exert on balance piston 38 in relation to the pressure.

Due to the area relationship between the balance piston 38 and spool 18, this limit becomes a percentage of the final brake cylinder pressure, e.g. 68%.

A screw-threaded cover 48 closes chamber 42 and includes a recess 73 that serves as a stop against which the valve element 39a rests under the influence of proportioning spring 47.

Spool valve 18 is connected to actuating piston 26 through a lost-motion connection therebetween. This lost-motion connection is provided by a connecting stem 49 that is fixed to spool valve 18 at its one end and is formed with a head 50 at its other end that projects into a bore 36 in actuating piston 26.

Head 50 of connecting stem 49 is axially spaced-apart from a shoulder washer 51 in bore 36, when the actuating piston 26 is in contact with its limit stop in the retracted position of sensor arm 34, and spool valve member 18 is in its rightward-most position, as shown. This distance between head 50 and shoulder washer 51 corresponds to the distance adjusting screw 37 of sensor arm 34 is retracted from the railway car side frame when the car is in a full load condition of car weight, as represented by line X. Thus, actuating piston 26 is free to move leftward from its shown position without imparting movement of spool valve 18 until the sensor arm 34 rotates through a range of travel sufficient to establish engagement with a fully loaded car side frame. In this manner, sensor arm 34 can be fully retracted to its shown position without requiring corresponding travel of spool valve member 18, so that the length of main body 6 housing the spool valve member 18 and bushing 16 can be limited in size.

BRAKE APPLICATION ON LOADED CAR

When a brake application is made by reducing the brake pipe pressure in a well-known manner, control valve device 3 connects air from the auxiliary reservoir 5 to brake cylinder supply pipe 8. The air supplied to pipe 8 is connected directly to brake cylinder 2 via inlet passage 7, open pressure control valve 39, outlet passage 9 and pipe 10; to actuating chamber 28 via inlet passage 7 and branch passage 7a; and to balancing chamber 46 via port 55, groove 56, and port 53.

The air admitted to balancing chamber 46 acts on one side of balance piston 38 to counteract the brake cylinder air pressure acting on the opposite side of balance piston 38. The opposing equal pressure areas of check valve element 39a are also subject to the brake cylinder pressure effective in cavity 42. Accordingly, proportioning valve 41 is force-balanced by the effective air loading, but is biased by spring 63 and proportioning spring 47 to maintain valve element 39a of pressure control valve 39 open. Consequently, the proportioning valve 41 is conditioned to operate in its non-proportioning mode, i.e., without reducing the pressure supplied to brake cylinder 2 via pipe 8.

As the brake cylinder pressure builds up, the corresponding pressure admitted to actuating chamber 28 acts on actuating piston 26. When the force of this pressure overcomes the opposing force of retraction spring 35, the sensor arm 34 is forced by push rod 32 to rotate about its pivot connection with extension 33 of end body 27 until adjusting screw 37 encounters the car side frame 80.

As long as the car weight is in the load range, such that the position of the car side frame 80 relative to the car body 82 is between the full load and changeover points represented by lines X and Z, shoulder washer 51 will move with actuating piston 26 only sufficiently to pick up head 50 of connecting stem 49 and pull spool valve 18 in a leftward direction a limited distance corresponding to the degree of rotation of sensor arm 34. This limited distance spool valve 18 moves within its load range of travel, wherein equalizing reservoir 13 is vented via passage 11, spool groove 19 and vent passage 14. Although proportioning spring 47 becomes increasingly relaxed with this leftward movement of spool valve 18, sufficient force is still provided to maintain valve element 39a of pressure control valve 39 in its open position through the entire load range of travel of spool valve 18. In this nonproportioning mode of operation, brake cylinder pressure thus corresponds to the pressure supplied to pipe 8 via control valve device 3.

In addition to valve element 39a being disengaged from fixed valve seat 43, it is also disengaged from valve seat 72 of release check valve 62, by the action of spring 63, during this non-proportioning mode of operation, thereby eliminating wear of valve element 39a during this period.

BRAKE RELEASE ON LOADED CAR

When a brake release is desired, brake pipe pressure is increased in a well-known manner to cause control valve device 3 to vent supply pipe S. With pressure control valve 39 being maintained in its open position, as explained, the air in brake cylinder 2 is released via outlet passage 9, open pressure control valve 39, inlet passage 7, and the vented supply pipe 8.

BRAKE APPLICATION ON EMPTY CAR

When the load sensor arm 34 is able to rotate sufficiently that adjusting screw 37 is deflected beyond the empty/load changeover point represented by line Z before encountering the car side frame during a brake application, the car weight is indicated as being in the empty range of car loading. Actuating piston 26 consequently pulls spool valve 18 further leftward into its empty range of travel in which registry is established between vent passage 52 and balancing chamber 46. Preferably only a single connecting port 55 is provided in bushing 16 via which air is able to flow from chamber 42 to balancing chamber 46. On the other hand, the number and/or the size of the ports in bushing 16 connecting chamber 46 to vent passage 52 is greater than that of the single connecting port 55, so that the pressure in chamber 46 is rapidly depleted when balance chamber 46 is connected to vent passage 52. This creates an unbalanced air load across balance piston 38 in the lefthand direction. Consequent leftward movement of balance piston 38 pulls release check valve 62 with it via stem 70 and roll pin 40. During this leftward movement of release check valve 62, spring 63 urges valve element 39a leftward into engagement with seat 43. This effects closure of pressure control valve 39 to establish the proportioning mode of operation of proportioning valve 41. This movement of proportioning valve 41 to its closed position causes O-ring 61 on balance piston 38 to be shifted to the left-hand side of connecting port 55 to cut off the supply of pressure to the vented balance chamber 46. In addition, the position of spool valve 18, as established by the vehicle load condition, determines the degree of compression of proportioning spring 47 at the time of closure of pressure control valve 39. The pick-up rate of proportioning spring 47 can be selected so as to make it more or less sensitive to the empty car load condition, as desired.

At the same time, spool groove 20 is registered with passage 11 to connect air from supply pipe 8 to equalizing reservoir 13 via inlet passage 7, branch passage 7a, actuating chamber 28, opening 30, central passage 22, connecting port 21, spool groove 20, passage 11 and pipe 12. This supply of air from pipe 8 to equalizing reservoir 13 occurs in parallel with the supply of air to brake cylinder 2 via proportioning valve 41. Consequently, the brake cylinder pressure will be somewhat modulated by virtue of the volumetric expansion of auxiliary reservoir 5 with equalizing reservoir 13. The volume of equalizing reservoir 13 is selected so that following a proportioned full service brake application, the interconnected equalizing reservoir and auxiliary reservoir pressures will be substantially the same as the brake pipe pressure. From an initial charge of 70 psi, this equalization will occur between approximately 48 psi and 52 psi, thereby effectively preventing an over-reduction of brake pipe pressure from producing a further increase in brake cylinder pressure.

Being located on the upstream side of brake cylinder device 2, it will be appreciated that pressure control valve 39 will prevent any backflow of air from brake cylinder 2 when the previously vented equalizing reservoir 13 is initially connected to inlet passage 7 in response to actuating piston 26 pulling spool valve 18 into its empty range of travel. This prevents any drop in the effective brake cylinder pressure while the equalizing reservoir pressure is building up to the effective brake cylinder pressure. Should the pressure at inlet passage 7 tend to drop when equalizing reservoir 13 is cut in, the resultant pressure reversal will effect closure of pressure control valve 39 to thereby isolate brake cylinder 2 from equalizing reservoir 13.

Following pressure equalization between volume reservoir 13 and brake cylinder 2, continued buildup of brake cylinder pressure will be proportioned in accordance with the effective ratio of proportioning valve 41 and the compression force of spring 47.

During this proportioning phase of the brake pressure buildup, the supply of air to brake cylinder 2 via supply pipe 8 is reduced by the action of proportioning valve 41 according to the differential air load across balance piston 38 and pressure control valve 39 offset by the force exerted by proportioning spring 47 according to the particular empty car load condition that might exist. It should be noted at this point that in the closed position of valve element 39a, a differential pressure area is subject to the air in supply pipe 8, as determined by the difference in diameter between balancing piston 38 and the diameter of valve element 39a within the area defined by valve seat 43. In this manner, a rightward acting force differential is exerted on proportioning valve 41 to effect opening of valve element 39a in response to a further increase of brake cylinder supply pressure when it is desired to increase a partial brake application.

As previously mentioned, proportioning spring 47 exerts a variable force on proportioning valve 41 depending upon the actual position of spool valve 18 in its empty range of travel, as determined by the degree of sensor arm rotation required before adjusting screw 37 encounters the car side frame. If, for example, the adjusting screw 37 encounters the car side frame just beyond the changeover point in the empty range of car weight, the degree of compression of proportioning spring 47 will approach a maximum due to minimal leftward movement of spool valve 18 into the empty range of travel. On the other hand, if the car weight is such that the adjusting screw 37 fails to encounter the car side frame until it is at the other end of the empty range, the degree of compression of proportioning spring 47 will be substantially reduced, due to further leftward movement of spool valve 18 into the empty range of travel. The force exerted on proportioning valve 41 by proportioning spring 47 will thus vary with the degree of car loading, such that the proportioned brake cylinder pressure will be greater for heavier car weights than for lighter car weights within the empty car brake range.

In accordance with the foregoing, the effect of proportioning spring 47 should now be clear in terms of achieving different levels of proportional brake cylinder pressure for a given brake application, depending upon the actual weight of a railway car that is conditioned for empty car braking.

By reason of the reduced diameter of spool valve 18 relative to that of balance piston 38, due to stepped bore 17, the force exerted by spring 47 can be selected to counteract the maximum brake cylinder pressure effective in actuating chamber 28 and acting on the lefthand end of spool valve 18, without overcoming the air load on balance piston 38, even when the minimum brake cylinder pressure is effective. In this manner, the effective force of proportioning spring 47 can be limited to a predetermined maximum value, so that during car rock and roll, spool valve 18 will be stabilized in empty range against undesired oscillation in response to the pressure in actuating chamber 28 when the lost-motion connection between actuating piston 26 and spool valve 18 effects disengagement therebetween.

BRAKE RELEASE ON EMPTY CAR

When a brake release is desired, brake pipe pressure is increased in a well-known manner to cause control valve device 3 to vent supply pipe 8. Consequently, the air under pressure control valve 39 within the area of valve seat 43 on which valve element 39a is seated, is vented with the air in equalizing reservoir 13, actuating chamber 28, and supply pipe 8 via control valve device 3. This tends to reinforce the closure force on valve element 39a. The reduction of pressure in chamber 28 allows spring 35 to retract sensing arm 34 and at the same time force actuating piston 26 to move in a rightward direction until shoulder washer 51 engages the lefthand side of spool valve 18. Continued rightward movement of actuating piston 26 by spring 35, as the pressure in chamber 28 continues to be vented via control valve device 3, forces spool valve 18 to also move in a rightward direction into contact with balance piston 38. Further rightward movement of this assembly acts through roll pin 40 and stem 70 of release check valve 62 to cause the release check valve seat 72 to be disengaged from valve element 39a, as shown in FIG. 3, it being understood that valve element 39a remains engaged with seat 43 due to the pressure and area differential across pressure control valve 39.

Since the diameter of release check valve seat 72 is significantly less than that of valve seat 43, the effective differential pressure area of release check valve 62 is accordingly considerably less than that of valve element 39a of pressure control valve 39. Consequently, the closure force acting on release check valve 62 during brake release is considerably less than the closure force acting on valve element 39a of pressure control valve 39. This has particular importance in limiting the overall size of empty/load valve device 1. Since the force of retracting spring 35 need not be as great to overcome the closure force of release check valve 62 as would otherwise be required to overcome the closure force of valve element 39a. It will be understood that in limiting the force of retracting spring 35, the size of actuating piston 26 may also be limited, since less force will be required to actuate sensing arm 34 against the force of retracting spring 35. It will be appreciated, therefore, that the release check valve arrangement of the present invention makes possible a more compact empty/load changeover valve device 1 than heretofore possible.

Following opening of release check valve 62, the heretofore trapped pressure in brake cylinder 2 and chamber 42 is vented via the open release check valve, opening 71 in valve element 39a, inlet passage 7, supply pipe 8 and control valve device 3. When the pressure in chamber 42 and brake cylinder 3 reduces sufficiently, retracting spring 35, acting through actuating piston 26, spool valve 18, and balance piston 38, will force valve element 39a off of its seat 43, thereby establishing final blowdown of brake cylinder pressure past pressure control valve 39.

When actuating piston 26 reaches its full release position, as shown in FIG. 1, in consequence of complete release of the brake cylinder pressure being realized, spool valve 18 will be positioned to vent equalizing reservoir 13 and to cut-off venting of balance chamber 46.

Proportioning spring 47, acting through balance piston 38, as shown in FIG. 1, forces valve element 39a against stop 73 and balance piston 38 is aligned axially in stepped bore 17 such that port 55 in bushing 16 is communicated with annular groove 56 and connecting passage 53 in the balance piston, thereby providing for re-pressurization of balance chamber 46 in response to a subsequent brake application.

In the event retracting spring 35 should become broken, so as to be incapable of effecting a brake release, as above described, bias spring 63 will become effective to disengage check valve seat 72 from valve element 39a in response to a drop in pressure within the seat area on the lefthand side of valve element 39a. When brake cylinder pressure is released from inlet 7 via line 8 and control valve device 3, the pressure acting on the righthand side of balance piston 38 holding release check valve 62 seated will reduce until at some predetermined value, bias spring 63 will become effective to disengage the check valve seat 62 from valve element 39a. In this manner, brake cylinder pressure is released in bypass of closed proportioning valve 41 until the pressure drop is such that proportioning spring 47 can force balance piston 38 in a rightward direction to the position shown in FIG. 1 wherein valve element 39a is disengaged from seat 43 to accommodate final and complete blowdown of brake cylinder pressure.

We claim:

1. An empty/load changeover valve device mountable on one of a sprung and an unsprung member of a railway car and operably disposed between the railway car control valve and brake cylinder devices for adjusting the brake cylinder pressure during a brake application according to the railway car load condition comprising:
    (a) an inlet passage connected to said control valve device and an outlet passage connected to said brake cylinder device;
    (b) load sensing means for providing an empty setting and a load setting of said changeover valve device including:
       (i) a sensing arm movable from a retracted position toward engagement with the other of the railway car sprung and unsprung members;
       (ii) a retracting spring connected to said sensing arm to urge said sensing arm toward said retracted position; and
       (iii) an actuating piston connected to said sensing arm and subject to fluid under pressure effective at said inlet passage during said brake application to urge movement of said sensing arm from said retracted position toward engagement with said other of the railway car sprung and unsprung members in opposition to said retracting spring;

(c) proportioning valve means having a proportioning mode of operation and a non-proportioning mode of operation including:
  (i) a fixed valve seat between said inlet and outlet passages;
  (ii) a valve element between said fixed valve seat and said outlet passage;
  (iii) a balance piston having equal opposing pressure areas, one of said pressure areas being subject to the fluid under pressure effective at said inlet passage; and
  (iv) a release check valve via which said valve element is connected to said balance piston;
(d) empty/load valve means adjacent said balance piston to which said actuating piston is connected for supplying the fluid under pressure effective at said inlet passage to the other of said pressure areas of said balance piston when said changeover valve device is in said load setting to establish a force balance condition of said balance piston and thereby provide said non-proportioning mode of operation, and for venting fluid under pressure from the other pressure area of said balance piston when said changeover valve device is in said empty setting to establish a differential force across said balance piston in the direction of engagement of said valve element with said fixed valve seat, thereby providing said proportioning mode of operation; and
(e) said release check valve including:
  (i) a release valve member connected to said balance piston and including a movable valve seat in axial, spaced-apart relationship with said balance piston;
  (ii) said valve element being disposed in the space between said balance piston and said movable valve seat, said movable valve seat being adapted to engage said valve element when said valve element is engaged with said fixed valve seat in said proportioning mode of operation, said empty/load valve means being engageable with said balance piston during said movement of said sensing arm toward said retracted position to effect disengagement of said movable valve seat from said valve element while said valve element is engaged with said fixed valve seat.

2. An empty/load changeover valve device, as recited in claim 1, wherein the area of said movable valve seat is less than the area of said valve element defined by said fixed valve seat.

3. An empty/load changeover valve device, as recited in claim 2, wherein said release valve member further includes:
(a) a stem of said movable valve seat connected to said balance piston; and
(b) said valve element having an opening through which said stem passes, such that said movable valve seat is disposed adjacent the side of said valve element opposite said fixed valve seat in surrounding relationship with said opening.

4. An empty/load changeover valve device, as recited in claim 1, wherein said release check valve further includes a bias spring between said release check valve and said valve element on the side thereof opposite said fixed valve seat.

5. An empty/load changeover valve device, as recited in claim 4, further comprising a proportioning spring interposed between said empty/load valve means and said balance piston, the compressive force of said proportioning spring varying in accordance with the load condition of said railway car in said empty setting of said changeover valve device.

6. An empty/load changeover valve device, as recited in claim 5, further characterized in that said empty/load valve means comprises:
(a) a stepped bore having a first diameter and a second diameter greater than said first diameter;
(b) a spool valve member operatively disposed in said first diameter of said stepped bore for axial movement between an empty range in said empty setting of said changeover valve device and a load range in said load setting of said changeover valve device;
(c) a lost-motion connection via which said actuating piston is connected to said spool valve at one end thereof; and
(d) said balance piston being operatively disposed in said second diameter of said stepped bore, said proportioning spring acting on the end of said spool valve opposite said one end thereof and exerting a force thereon sufficient to counteract the effective fluid pressure force acting on said one end in said empty range of said spool valve member, whereby said spool valve member is prevented from being shifted from said empty range to said load range when said actuating piston is disengaged from said spool valve through said lost-motion connection therebetween during rock and roll oscillations of said railway car.

7. An empty/load changeover valve device, as recited in claim 6, further characterized in that the maximum force exerted by said proportioning spring in said empty range of said spool valve member is insufficient to effect axial displacement of said balance piston against the fluid pressure force acting thereon.

8. An empty/load changeover valve device, as recited in claim 7, further comprising:
(a) an axially fixed cover member closing said stepped bore; and
(b) a stop on said cover member, said proportioning spring urging said valve element into engagement with said stop through the intermediary of said balance piston.

9. An empty/load changeover valve device, as recited in claim 8, wherein said lost-motion connection comprises:
(a) a bore in said actuating piston;
(b) a stem fixed at one end to said one end of said spool valve device, the other end of said stem projecting into said bore in said actuating piston and being formed with a head;
(c) a shoulder washer in said bore of said actuating piston, said head being axially spaced apart from said shoulder washer a predetermined distance when said actuating piston is engaged with said spool valve and engaged with said shoulder washer when relative axial movement between said actuating piston and said spool valve exceeds said predetermined distance.

10. An empty/load changeover valve device, as recited in claim 9, wherein said predetermined distance corresponds to movement of said sensing arm between said retracted position and engagement thereof with said other of said sprung and unsprung members in a full load condition of said railway car.

* * * * *